(12) United States Patent
Shahid et al.

(10) Patent No.: US 11,956,129 B2
(45) Date of Patent: Apr. 9, 2024

(54) SWITCHING AMONG MULTIPLE MACHINE LEARNING MODELS DURING TRAINING AND INFERENCE

(71) Applicant: Ciena Corporation, Hanover, MD (US)

(72) Inventors: Arslan Shahid, Stittsville (CA); Saurabh Dinesh Brahmankar, Pune (IN); Sudhan Puranik, Pune (IN); Thomas Triplet, Manotick (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/714,235

(22) Filed: Apr. 6, 2022

(65) Prior Publication Data
US 2023/0269143 A1 Aug. 24, 2023

(30) Foreign Application Priority Data
Feb. 22, 2022 (IN) .............................. 202211009372

(51) Int. Cl.
| | |
|---|---|
| *H04L 41/16* | (2022.01) |
| *G06F 40/284* | (2020.01) |
| *G06N 3/045* | (2023.01) |
| *G06N 20/20* | (2019.01) |
| *H04L 41/0631* | (2022.01) |

(52) U.S. Cl.
CPC ............ *H04L 41/16* (2013.01); *G06F 40/284* (2020.01); *G06N 3/045* (2023.01); *G06N 20/20* (2019.01); *H04L 41/0636* (2013.01)

(58) Field of Classification Search
CPC ..... H04L 41/16; H04L 41/0636; G06N 20/20; G06N 3/045; G06F 40/284
See application file for complete search history.

(56) References Cited

U.S. PATENT DOCUMENTS

| | | | |
|---|---|---|---|
| 10,171,161 B1 | 1/2019 | Côté et al. | |
| 10,841,181 B2 | 11/2020 | Côté et al. | |
| 10,873,533 B1 * | 12/2020 | Ismailsheriff | ........... H04L 47/29 |
| 11,048,727 B2 | 6/2021 | Triplet et al. | |
| 11,126,929 B2 | 9/2021 | Janulewicz et al. | |
| 2017/0339022 A1 * | 11/2017 | Hegde | ..................... H04L 41/06 |
| 2018/0248905 A1 | 8/2018 | Côté et al. | |
| 2019/0130303 A1 * | 5/2019 | Bigaj | ..................... G06N 20/00 |
| 2019/0280942 A1 | 9/2019 | Côté et al. | |
| 2019/0303726 A1 | 10/2019 | Côté et al. | |
| 2019/0347282 A1 * | 11/2019 | Cai | ........................ G06N 5/022 |

(Continued)

FOREIGN PATENT DOCUMENTS

| | | |
|---|---|---|
| CA | 3 124 442 A1 | 8/2020 |
| WO | 2021118949 A2 | 6/2021 |

*Primary Examiner* — Dhairya A Patel
*Assistant Examiner* — Eui H Kim
(74) *Attorney, Agent, or Firm* — Clements Bernard Walker; Christopher L. Bernard

(57) ABSTRACT

Systems and methods for analyzing and prioritizing alarms in a communications network are provided. A method, according to one implementation, includes the step of obtaining network information regarding the condition of a network. Using the network information, the method further includes performing a hybrid Machine Learning (ML) technique that includes training and inference of a plurality of ML models to calculate metrics of the network. Also, the method includes the step of selecting one of the plurality of ML models based on a combination of the metrics.

18 Claims, 8 Drawing Sheets

(56) References Cited

U.S. PATENT DOCUMENTS

| | | |
|---|---|---|
| 2019/0370218 A1* | 12/2019 | Di Pietro ............ G06F 18/2178 |
| 2020/0097981 A1* | 3/2020 | Teo ...................... G06Q 30/016 |
| 2020/0151591 A1* | 5/2020 | Li ........................... G06N 3/08 |
| 2020/0242483 A1* | 7/2020 | Shashikant Rao .... G06F 16/285 |
| 2020/0259717 A1 | 8/2020 | Ong et al. |
| 2020/0287788 A1 | 9/2020 | Triplet et al. |
| 2021/0028973 A1 | 1/2021 | Côté et al. |
| 2021/0099378 A1 | 4/2021 | Alaettinoglu et al. |
| 2021/0385135 A1 | 12/2021 | Côté et al. |
| 2022/0239758 A1* | 7/2022 | Klein ....................... G06N 5/04 |
| 2022/0385525 A1* | 12/2022 | Krishnaswamy ... H04L 41/0686 |

* cited by examiner

| | precision | recall | F1 score | support |
|---|---|---|---|---|
| Actionable | 1.00 | 1.00 | 1.00 | 5 |
| Non-actionable | 1.00 | 1.00 | 1.00 | 2 |
| Accuracy | | | 1.00 | 7 |
| macro avg | 1.00 | 1.00 | 1.00 | 7 |
| weighted avg | 1.00 | 1.00 | 1.00 | 7 |

Classification Report:

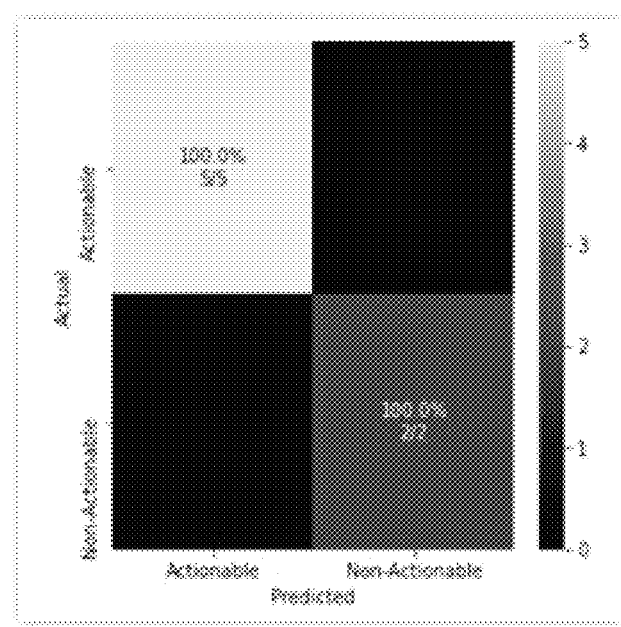

FIG. 9

| specific_problems | true_labels | predicted_labels |
|---|---|---|
| Database Application failure | Actionable | Actionable |
| SLA Collection Check Monitor Application failure | Actionable | Actionable |
| ORL looks normal | Non-Actionable | Non-Actionable |
| PM Collection Check Monitor Application failure | Actionable | Actionable |
| Bad weather issueService Loss | Actionable | Actionable |
| Link Down | Actionable | Actionable |
| Login was Successful | Non-Actionable | Non-Actionable |

FIG. 10

SWITCHING AMONG MULTIPLE MACHINE LEARNING MODELS DURING TRAINING AND INFERENCE

TECHNICAL FIELD

The present disclosure generally relates to networking systems and methods. More particularly, the present disclosure relates to determining the condition of a network and switching, over time, among a plurality of different Machine Learning (ML) models during training and inference.

BACKGROUND

Generally, detecting and analyzing faults in a communications network is an important part of maintaining the network. A real-time assurance system can be used to quickly identify issues in the network to allow some type of remediation to be performed to avoid future faults and/or recover from network outages.

Typically, the process of describing these fault is done manually by a network operator, administrator, domain expert, technician, etc. Moreover, network analysis can be a subjective action and can vary from one network operator to another. Currently, there are approaches that automate this process by applying rules which work in certain scenarios. However, the conventional approaches are not very robust with respect to new data. Another challenge is that these rules should be kept up-to-date and may also vary from one vendor to another.

In addition, conventional systems have been created to automate the network analysis process by applying Machine Learning (ML) approaches. Typically, these ML methods may work well when a sufficient amount of training data is available. However, their performance suffers when little data is obtained and therefore may not be effective in a "cold start" scenario, such as when a network is first deployed or when a limited amount of network data is available (e.g., less than six months' worth of data). Normally, it will take some time after such a system is deployed in a green-field scenario before useful insights can be drawn, since a larger dataset may be required to get better results. Thus, the practicality of conventional ML models (e.g., conventional Neural Network, Random Forrest, KNNs, XGBoost, etc.) may be reduced when little data is available.

Another aspect of fault processing includes the prioritization of multiple alarms. When multiple alarms are received, ML models should be able to determine the priority of the alarms for remediating the alarms in a certain order. Some ML solutions for alarm prioritization may include at least the automatic suppression of non-actionable alarms (i.e., alarms where no specific action is needed). Also, conventional systems may include static rules to place the same classes, data, and/or concepts together.

Conventional system may benefit from creating workflows in monitoring applications, which then differentiate user comments from ticket information. Domain experts can help to differentiate several user comments into relevant or irrelevant clusters and then a Network Operations Center (NOC) engineer can perform actions based on the network problems.

It may usually be difficult to keep track of system performance over time. Also, a production model may become outdated if it is not improved on a regular basis, especially when it comes to maintaining the ML model ecosystem after the network is deployed.

Most of the existing ML methods rely on hand-crafted static rules or workflows to classify similar data. Humanly-entered comments are not fixed the in the conventional solutions. Thus, there is a need to add new static rules for a workflow every time new comments are observed, which can be a repetitive task. Humanly-entered text is often not easy to understand and is not reliable when attempting to understand the actual context of human comments. Hence, conventional systems are not capable of leveraging such crucial information for solving network problems. Often, manual intervention by a network operator is required to understand the various issues, which can be consume inordinate amounts of time and effort. Therefore, there is a need in the field of communications network, or other fields, to enable automatic ML techniques for handling issues in a network and to overcome many of the issues of the conventional systems.

BRIEF SUMMARY

The present disclosure provides systems and methods utilizing hybrid training/inference ML techniques, such as for analyzing and prioritizing network alarms. A process, according to one embodiment, includes obtaining network information regarding the condition of a network. Using the network information, the process further includes the step of performing a hybrid Machine Learning (ML) technique that includes training and inference of a plurality of ML models to calculate metrics of the network. The process also includes the step of selecting one of the plurality of ML models based on a combination of the metrics.

The network information may include, for example, a) network fault information, b) network alarm information, and c) textual comments entered by a network operator describing the condition of the network. In some embodiments, the process may further include the step of performing the hybrid ML technique in order to prioritize faults or alarms with respect to the network. Furthermore, the process may include performing a pre-processing technique to prepare the textual comments for use with the hybrid ML technique. For example, the pre-processing technique may include a Natural Language Processing (NLP) methodology including the actions of a) splitting concatenated words, b) removing stop words, c) stemming and lemmatization to identify root words, d) tokenization, e) using a word-to-vector model, f) using a document-to-vector model, and/or g) using an embedding process for handling terminology related to the field of telecommunications.

The selected ML model described above may be selected based on a size of a dataset of the network information. The selected ML model may also be selected based on a) an historic accuracy score of each of the plurality of ML models calculated during training, b) an expected accuracy score of each of the plurality of ML models for later use during inference, c) a computational cost of each of the plurality of ML models during training, d) a training time associated with each of the plurality of ML models, and/or e) an estimated inference time associated with each of the plurality of ML models.

The process may utilize a first ML model when a network is initially deployed, where the first ML model may be a Deep Neural Network (DNN) model. The process may then switch from the first ML model to a second ML model based on the above-mentioned combination of metrics. For example, the first ML model may provide greater accuracy than the second ML model, and the second ML model may provide a faster training time and faster inference time than the first ML model. More particularly, according to some embodiments, the first ML model may be a Siamese Neural Network (SNN) model and the second ML model may be an XGBoost model.

The process may further include the step of processing the calculated metrics to differentiate actionable alarms from non-actionable alarms. In some embodiments, the process may be implemented by a system that is part of a Network Operations Center (NOC). The step of obtaining network information may include the actions of a) receiving information from network equipment provided by different vendors, b) receiving information from different networking layers, c) receiving information from different domains of the network, d) receiving information from an alarm management system, and/or e) receiving information from a ticketing system. Also, the process may include the step of continuously retraining the selected ML model using new network information.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 9 is a graph illustrating an example of a confusion matrix for evaluating an ML model created by the computing system of FIG. 1, according to various embodiments.

FIG. 10 is a table illustrating sample results for showing the capability of the computing system of FIG. 1 to accurately predict network alarms, according to various embodiments.

DETAILED DESCRIPTION

Figure 1:
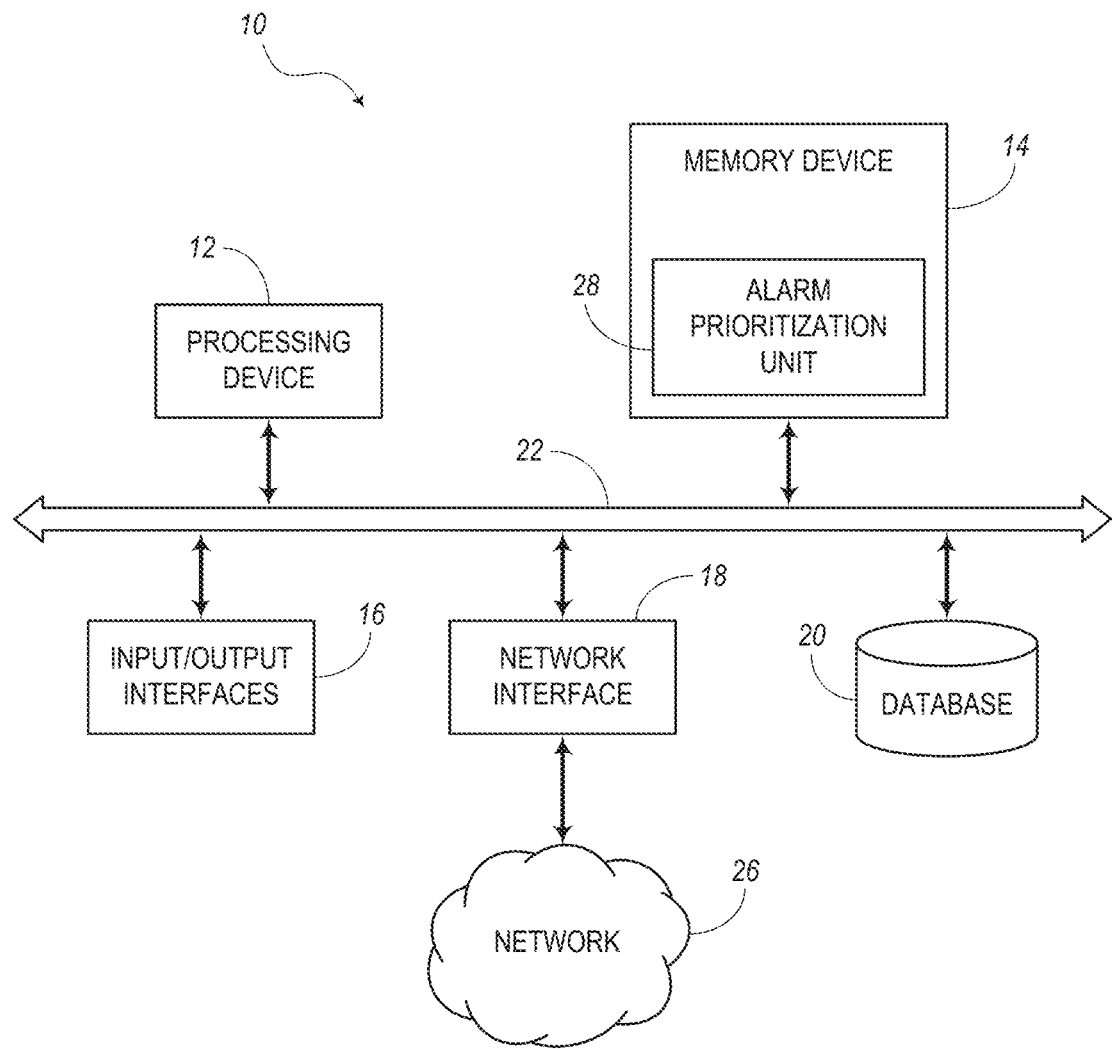
FIG. 1 is a block diagram illustrating a computing system for prioritizing alarms in a network using Machine Learning (ML) boosting methodologies, according to various embodiments of the present disclosure.

The present disclosure relates to systems and methods for handling faults, alarms, and other issues in a system, such as communications or telecommunications system or network. According to various embodiments, the systems and methods described herein are configured to utilize multiple Machine Learning (ML) models (e.g., ML processes, techniques, algorithms, etc.). For example, a first ML model may be used at an early stage, such as when a network is first deployed or when the network is modified and reset whereby only new information about the network is relevant. At this early stage, a high performing ML model (e.g., a Neural Network (NN), Siamese NN (SNN), or other type of model) may be used, even when little data is available. However, use of such a high performing ML model may be computationally more expensive, especially when much more information is available such as after the network has been operating for an extended amount of time (e.g., several months). At this stage (i.e., after many months), it may be beneficial to switch to a less costly ML model (e.g., XGBoost or the like) that can perform adequately when more information is available.

The systems and methods of the present disclosure are configured to automatically analyze the performance of multiple ML models during training and utilize one ML model at a time depending on various factors. For example, it may be determined that SNN is able to perform at a high level when little data is available. However, after a certain amount of time, the size of the dataset regarding network information is configured to increase to a point (e.g., 40 or 50 data points) where one or more other ML models (e.g., XGBoost) can be used. For example, XGBoost usually performs well when the size of the dataset is over a certain threshold (e.g., 40 to 50 data points). Also, XGBoost is able to perform at a consistently quick manner, regardless of the size of the dataset. Therefore, the systems and methods of the present disclosure are configured to switch to another ML model having a lower cost (e.g., faster) when the dataset reaches a certain size or when other characteristics are applicable.

Also, the present disclosure is configured to provide a system for fault description analysis that combines Natural Language Processing (NLP) techniques with a state-of-the-art boosting ML approach to differentiate actionable and non-actionable comments. For example, an "actionable" comment may refer to a fault that can be remediated by taking some form of action, and a "non-actionable" comment may refer to a scenario that does not need any actions (e.g., when a section of the network is error-free).

The embodiments of the present disclosure provide significant improvements over the conventional applications of ML for automatic alarm prioritization to establish a priority of when each alarm situation should be handled according to a certain order. This can make network operations faster, easier, and cheaper for a Network Operations Center (NOC) team. Furthermore, the present disclosure provides novel systems and methods that use a "hybrid" approach for both ML model training and ML model inference (i.e., real-time usage). This hybrid approach allows accurate results using significantly less training data. Therefore, the systems and methods of the present disclosure can meet an immediate need of analyzing and prioritizing alarms and faults when a network is firm deployed or when an event occurs that resets the network data. With the ability to operate with just a small amount of training data, the present embodiments can provide a practical application for new network deployments since the present systems and methods can start providing useful insights much sooner.

The systems and methods of the present disclosure have been tested with real-world data and have shown to perform very well. The embodiments described herein achieved 100% accuracy for alarm prioritization while also performing with nearly one fourth of the training data needed by the conventional systems, when tested in communications network environment. In practice, the conventional approaches required four to six months of data (e.g., real-world data) to be effective. The present disclosure demonstrated an improvement by performing at a higher level even when only five weeks of data was used.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

In one embodiment, the present disclosure proposes a two-step process to perform analysis of fault description that leverages NLP and boosting ML to build a system that is very robust and generalizes well to new types of faults (e.g., faults from equipment from different vendors, faults at different networking layers, faults on different domains, etc.). In order to deliver good performance at the beginning and avoid cold-start problems, the embodiments of the present disclosure are configured to use a hybrid ML model training and ML model inference approach. In this hybrid approach, the present systems are configured train a Siamese Neural Network (SNN) initially when there is limited training data and then switch over to XGBoost once enough training data is available. At the switch-over time, both ML models are typically able to perform equally well. The SNN gives very high accuracy with a handful of training examples (also known as "few-shot learning"). However, training a SNN is usually considerably more computationally intensive, which normally results in longer training times (e.g., over 200 times longer than some other ML models). Hence, the systems and methods of the present disclosure are configured only train and maintain SNN when the training data is limited.

General-Purpose Computer

FIG. 1 is a block diagram illustrating an embodiment of a computing system 10 for prioritizing alarms in a network 26 using ML boosting methodologies. In the illustrated embodiment, the computing system 10 may be a digital computing device that generally includes a processing device 12, a memory device 14, Input/Output (I/O) interfaces 16, a network interface 18, and a database 20. It should be appreciated that FIG. 1 depicts the computing system 10 in a simplified manner, where some embodiments may include additional components and suitably configured processing logic to support known or conventional operating features. The components (i.e., 12, 14, 16, 18, 20) may be communicatively coupled via a local interface 22. The local interface 22 may include, for example, one or more buses or other wired or wireless connections. The local interface 22 may also include controllers, buffers, caches, drivers, repeaters, receivers, among other elements, to enable communication. Further, the local interface 22 may include address, control, and/or data connections to enable appropriate communications among the components 12, 14, 16, 18, 20.

It should be appreciated that the processing device 12, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 12 may also include or utilize stored program instructions (e.g., stored in hardware, software, and/or firmware) for control of the computing system 10 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 14 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 14 may incorporate electronic, magnetic, optical, and/or other types of storage media. The memory device 14 may have a distributed architecture, where various components are situated remotely from one another, but can be accessed by the processing device 12.

The memory device 14 may include a data store, database (e.g., database 20), or the like, for storing data. In one example, the data store may be located internal to the computing system 10 and may include, for example, an internal hard drive connected to the local interface 22 in the computing system 10. Additionally, in another embodiment, the data store may be located external to the computing system 10 and may include, for example, an external hard drive connected to the Input/Output (I/O) interfaces 16 (e.g., SCSI or USB connection). In a further embodiment, the data store may be connected to the computing system 10 through a network and may include, for example, a network attached file server.

Software stored in the memory device 14 may include one or more programs, each of which may include an ordered listing of executable instructions for implementing logical functions. The software in the memory device 14 may also include a suitable Operating System (O/S) and one or more computer programs. The 0/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 12), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 12 or other suitable circuitry or logic). For example, when executed, the instructions may cause or enable the processing device 12 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 12), or any suitable combination thereof. Software/firmware modules may reside in the memory device 14, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 16 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 16 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 18 may be used to enable the computing system 10 to communicate over a network, such as the network 26, the Internet, a Wide Area Network (WAN), a Local Area Network (LAN), and the like. The network interface 18 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 18 may include address, control, and/or data connections to enable appropriate communications on the network 26.

The computing system 10 may further include an alarm prioritization unit 28. The alarm prioritization unit 28 may be implemented in any suitable combination of hardware, software, firmware, etc. in the processing device 12 and/or memory device 14. The alarm prioritization unit 28 may be configured with instructions, commands, logic, computer-execution instructions, etc. and may be stored on any suitable non-transitory computer-readable media (e.g., memory device 14, database 20, etc.). The alarm prioritization unit 28 may include instructions that, when executed, enable or cause the processing device 12 to perform certain actions, as described in detail in the present disclosure.

According to some embodiments, the computer system 10 (equipped with the alarm prioritization unit 28) may include instructions configured to enable the processing device 12 to obtain network information regarding the condition of a network. Using the network information, the alarm prioritization unit 28 may enable the processing device 12 to perform a hybrid Machine Learning (ML) technique that includes training and inference of a plurality of ML models to calculate metrics of the network. Also, the alarm prioritization unit 28 is configured to cause the processing device 12 to select one of the plurality of ML models based on a combination of the metrics.

More particularly, the network information may include a) network fault information, b) network alarm information, and/or c) textual comments entered by a network operator describing the condition of the network. The instructions may further enable the processing device 12 to perform the hybrid ML technique in order to prioritize faults or alarms with respect to the network. The instructions may further enable the processing device 12 to perform a pre-processing technique to prepare the textual comments for use with the hybrid ML technique. For example, the pre-processing technique may include a Natural Language Processing (NLP) methodology including the actions of a) splitting concatenated words, b) removing stop words, c) stemming and lemmatization to identify root words, d) tokenization, e) using a word-to-vector model, f) using a document-to-vector model, and/or g) using an embedding process for handling terminology related to the field of telecommunications.

The computing system 10 may further be defined whereby the selected ML model is selected based on a size of a dataset of the network information. The selected ML model may be selected, for example, based on a) an historic accuracy score of each of the plurality of ML models calculated during training, b) an expected accuracy score of each of the plurality of ML models for later use during inference, c) a computational cost of each of the plurality of ML models during training, d) a training time associated with each of the plurality of ML models, and/or e) an estimated inference time associated with each of the plurality of ML models.

The instructions of the alarm prioritization unit 28 may further enable the processing device 12 to utilize a first ML model when a network is initially deployed, where the first ML model may be a Deep Neural Network (DNN) model. The processing device 12 may further be enabled to switch from the first ML model to a second ML model based on the above-described combination of metrics. The first ML model, for example, may be configured to provide greater accuracy than the second ML model. The second ML model may be configured to provide a faster training time and faster inference time than the first ML model. More specifically, the first ML model may be a Siamese Neural Network (SNN) model and the second ML model may be an XGBoost model.

The instructions may further enable the processing device 12 to process the calculated metrics to differentiate actionable alarms from non-actionable alarms. In some embodiments, the computing system 10 may be part of a NOC. The step of obtaining the network information may include the actions of a) receiving information from network equipment provided by different vendors, b) receiving information from different networking layers, c) receiving information from different domains of the network, d) receiving information from an alarm management system, and/or e) receiving information from a ticketing system. The instructions may further enable the processing device 12 to continuously retrain the selected ML model using new network information as it is obtained.

In the present disclosure, the computer device 10 is configured to utilize the network interface 18 for collecting network data. The network interface 18 may be configured to collect alarm data and fault data. The I/O interfaces 16 may be configured to receive text from a network operator, technician, administration, etc. The user-entered textual comments from an expert user may include classification information about the alarms or faults. In some embodiments, alarm and fault data may be obtained from an alarm management system, an analytics system, an assurance system, a ticketing system (e.g., ServiceNow), or the like. This data may be obtained via the network interface 18. The accumulated data may be used to construct training data that can be fed to the ML models. For example, the various ML models may be part of the alarm prioritization unit 28 and/or may be stored or implemented in the memory device 14 and/or database 20. According to one example, the ML models known as Siamese Neural Network (SNN) and XGBoost may be used in the computing system 10 for model training. In other embodiments, other ML models may be used.

Automated Hybrid ML Processes

Figure 2:
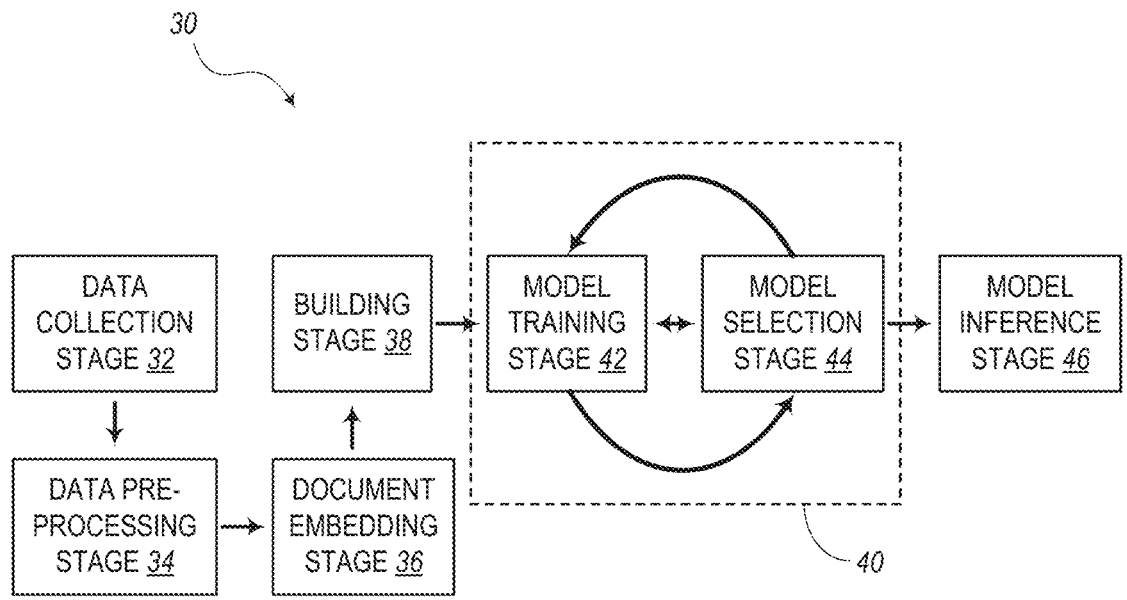
FIG. 2 is a flow diagram illustrating a process flow of the computing system of FIG. 1, according to various embodiments.

FIG. 2 is a flow diagram illustrating a process flow 30 of the computing system 10. In some embodiments, the process flow 30 may represent actions of the alarm prioritization unit 28 shown in FIG. 1. The process flow 30 includes an overall flow that starts with a data collection stage 32. For example, the data collection stage 32 may include a receiving step for obtaining freeform comments and freeform textual data from different sources. The data may be collected via the network 26 from equipment provided by different vendors. The data may be from different networking layers and/or from different domains of the network 26. Data may be collected from the user (via I/O interfaces 16), from different software modules on the memory device 14, from ticketing tools (e.g., ServiceNow), etc. Unlike some conventional methods that rely on hand-crafted static rules, the process flow 30 may be completely data-driven, which allows it to learn very complex rules from network data.

The next stage of the process flow 30 is a data pre-processing stage 34 (or data cleaning stage). For example, the data pre-processing stage 34 may include Natural Language Processing (NLP) methods. Also, when used in the environment of networking, certain NLP methods associated with normal networking linguistics may be analyzed and interpreted. The textual descriptions and/or comments (e.g., regarding faults) may be free-form text, which normally cannot be directly fed into an ML for training. Therefore, the process flow 30 may follow the NLP techniques to clean and pre-process the incoming data streams.

The process flow 30 further includes a document embedding stage 36. As a further NLP step, the document embedding stage 36 may include a trained "doc2vec" model based on the pre-processed data to learn the document embeddings with emphasis on the environment context (e.g., data in a telecommunications network). The document embeddings are a type of sentence representation that allows sentences with similar meanings to have a similar representation. For example, FIG. 3 described below shows two sentences that look very different but have a similar meaning.

Also, the process flow 30 includes an ML classification stage 38. Once the vectorized representation (from the document embedding stage 36) for all fault comments has been learned and applied, the ML classification stage 38 is configured to use this vectorized data along with classifications or labels (e.g., actionable, non-actionable) to train multiple ML models (e.g., Siamese Neural Network (SNN), XGBoost, etc.).

Next, the process flow 30 includes a hybrid boosting stage 40, which includes various significant aspects of the present disclosure. For example, the term "hybrid" in this complex is used to represent a concept of combining ML training with ML inference, where training is used to form an ML model and inference is used for applying real-time data to interpret the condition of the network 26 and perform various actions in response to the condition. As shown, the hybrid boosting stage 40 includes a model training stage 42 and a model selection stage 44 and is configured to automatically perform ML techniques according to the various embodiments of the present disclosure.

The model training stage 42 may include collecting the textual data and comments from a NOC operator or engineer, ticket information from a ticketing tool, and other data from other data sources used for training the doc2vector model. The results may be the document embeddings. The document embeddings are fed to all the ML models being used (e.g., SNN, XGBoost, etc.) for training. With SNN, it is possible to form several data triplets, which can be used for training the SNN.

The model selection stage 44 may include the automatic selection of an ML model for performing a novel action with respect to the hybrid boosting stage 40 in an automated manner. The model selection stage 44 may be configured to handle scenarios in which it decides whether to use a Neural Network (NN) architecture (e.g., SNN) or some other ML architecture (e.g., XGBoost). This gives the process flow 30 an advantage in that it can decide which model framework to use based on performance factors such as training time, accuracy scores, computational expense, and so on. For example, once both SNN and XGBoost are trained, the model selection stage 44 may be performed based on training accuracy of the two (or more) models. If SNN has much higher accuracy, then it will be used for inference. On the other hand, XGBoost may be used and may be re-trained the next time until both models start to demonstrate similar accuracy scores. Once this is observed, the less complex and faster XGBoost can be trained and used for ML inference.

Furthermore, the process flow 30 includes a model inference stage 46, which may include the running of ML algorithms to make predictions or forecasts for the operation of the network 26 (or other system under observation and ML control). The model inference stage 46 includes using the selected model to predict the live network data (or changes) and classify this data into relevant buckets. Prediction results may include classifications or labels (e.g., actionable, or non-actionable), which may be updated on the fly to filter out high-priority needs. As such, the network operator at the NOC can take measures to fix or remediate any network faults/alarms that are labeled "actionable." These predictions can also be leveraged to trigger any automatic actions in the system using workflow automation frameworks (e.g., Camunda workflow automation manager or the like).

It has been found through testing that the results are satisfactory and prove the concept of the present disclosure very well. Even if there are very few data samples (e.g., at an initial phase of network development or deployment), still the hybrid approach can make the most of the limited information passed during the model training stage 42 while minimizing the computational overhead.

In the systems and methods of the present disclosure, there is typically no constraints on the fault data. The description and/or comments for faults or alarms could be free-form text. Hence, this information cannot be directly fed into an ML model for training. As such, the process flow 30 may utilize the data pre-processing stage 34 or document embedding stage 36, which may be configured to perform the following NLP techniques to pre-process the data into features:

1. Probabilistically split concatenated words using NLP, based on English Wikipedia uni-gram frequencies (e.g., splitting "linkdown" to "link down").
2. Remove stop words which carry no information (e.g., removing "the," "is," "with," etc.). Some stop words may be preserved if they carry information in the context of network data (e.g., "up," "down," etc.).
3. Stemming and Lemmatization to identify root words from the words that are associated with the root words (e.g., identifying the root word "success" from the words "success," "succeed," "successful," "successfully," etc.).
4. Tokenization of the fault description, which results in an array of root words that constitute the sentence.
5. As a final NLP step, a doc2vec model is trained based on the pre-processed data to learn the document embeddings. In the networking field, emphasis may be placed on the context of words included in the telecommunications data environment. The document embeddings are a type of sentence representation that allows sentences with similar meaning to have a similar representation. As described below with respect to FIG. 3, it can be understood that the two sentences look very different but have similar interpretations.

Figure 3:
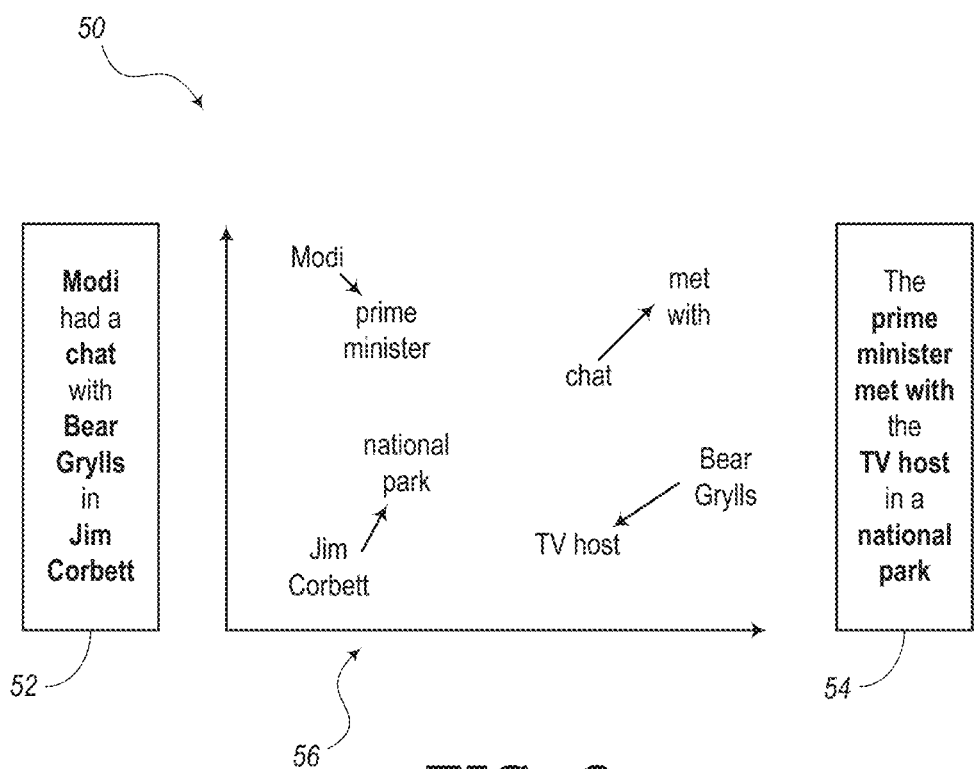
FIG. 3 is a diagram illustrating a word embedding plot, according to various embodiments.

FIG. 3 is a diagram illustrating an example of a word embedding plot 50. The plot 50 includes a first document 52 (e.g., sentence) that is mapped to a second document 54 (e.g., sentence) by a mapping 56. The plot 50 shows the word embedding function for the two sentences 52, 54, which look different but convey the same meaning. For example, the mapping 56 includes a number of vectors for showing the similar between the pairs of words (or phrases) having the same or similar meaning. The name "Modi" is mapped to "prime minister"; the verb "chat" is mapped to the phrase "met with"; the subject "Bear Grylls" is mapped to "TV host"; and the location "Jim Corbett" is mapped to "national park."

Once the vectorized representation for all fault comments has been learned and applied, the computing system 10 can use this vectorized data along with the labels (e.g., actionable, non-actionable) to train an ML classifier (e.g., SNN, XGBoost). The computing system 10 may leverage a Deep Neural Network (DNN), such as SNN, to learn from a handful of training examples to avoid the cold-start problem when little data is available.

It may be noted that SNN was initially introduced for facial recognition. One goal is to learn a mapping function that transforms each input into a much lower dimensional embedding, such that the following conditions are meet:

1. Two similar inputs (i.e., inputs from the same class) produce embeddings so that the mathematical distance between them is small.
2. Two different inputs (i.e., inputs from different classes) produce embeddings so that the mathematical distance between them is large.
3. The embeddings are L2-normalized (i.e., forced to be on a unit hypersphere).

Figure 4:
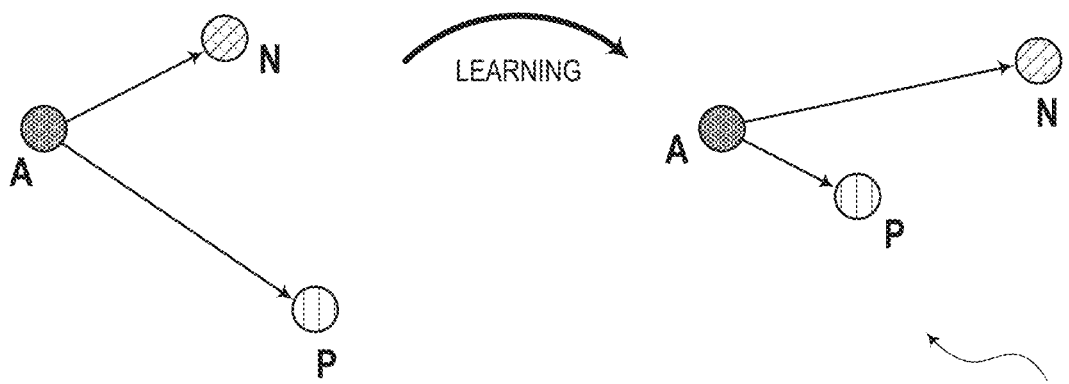
FIG. 4 is a diagram illustrating a learning objective of a Siamese Neural Network (SNN), according to various embodiments.

The SNN may include a DNN that is fed three inputs at the same time (e.g., an Anchor, a Positive, and a Negative) to constitute a single training example. The output of the NN may be L2-normalized, which results in a set of embedding vectors for each anchor, positive, and negative input. One goal of an NN is to learn the weights that result in embeddings such that the mathematical distance between embeddings for Anchor and Positive is smaller when compared to the distance between Anchor and Negative. This is shown in FIG. 4. The above condition may be used to construct triplet loss function, which is then used as a minimization objective for the NN training.

For example, the triplet loss formulation may include the following conditions:

$$\text{distance}(A,P) < \text{distance}(A,N)$$

$$\text{distance}(A,P) - \text{distance}(A,N) < 0$$

$$\text{distance}(A,P) - \text{distance}(A,N) + \text{margin} < 0 \text{ (with margin} > 0)$$

It may be noted that the triplet formulation may introduce a "margin" in the loss equation. This may be done to prevent the network from learning an easy solution that satisfies the above equation by simply outputting zeros for everything.

FIG. 4 is a diagram illustrating an example of a learning objective 60 of the SNN. For example, the learning objective 60 may utilize aspects described in F. Schroff et al., "A unified embedding for face recognition and clustering", arXiv preprint arXiv:1503.03832, 2015. 1, the contents of which are incorporated by reference herein.

The ML inference on the new incoming data is then performed by passing it through the NLP pre-processing followed by a doc2vec transformation. The output of doc2vec is then passed as input to the SNN to compute the embedding. This embedding is then compared against known embeddings from training data for each class. For example, Euclidean distance may be computed between embedding for new samples and embeddings of each of the known classes. Classification for the expected class is then performed based on the shortest distance above a certain threshold. This can be represented by the following equation:

$$\mathrm{argminClass}(|\mathrm{distance}(\mathrm{embeddingSample},\mathrm{embeddingClass})|)$$

Figure 5:
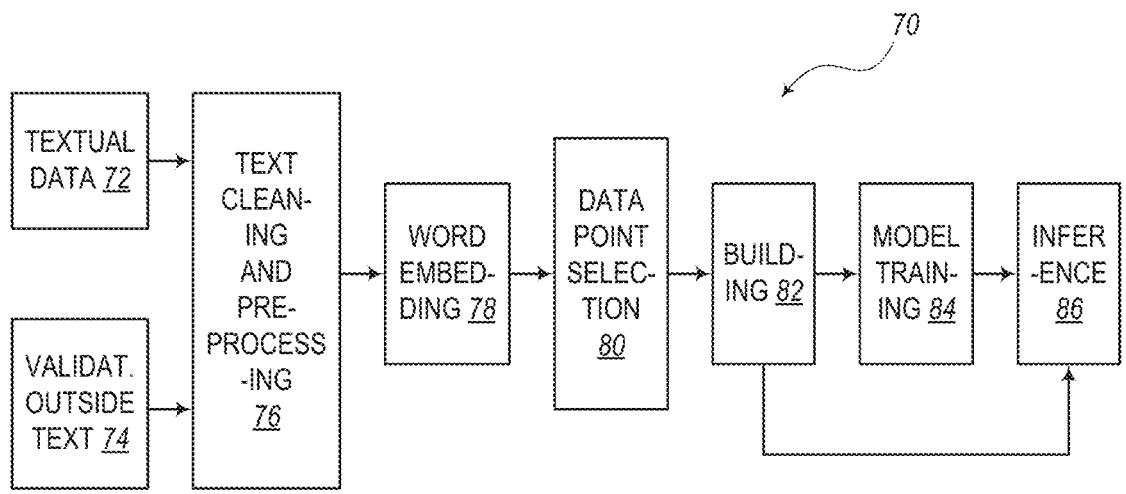
FIG. 5 is a block diagram illustrating an ML pipeline of the alarm prioritization unit shown in FIG. 1, according to various embodiments.

FIG. 5 is a block diagram showing an embodiment of an ML pipeline 70 of the alarm prioritization unit 28 for analyzing fault information, alarm information, and user-entered comments with respect to a network (e.g., network 26). In addition to fault/alarm data, textual data 72 and validation outside text 74 is obtained. The textual data 72 and validation outside text 74 is provided to a text cleaning and pre-processing module 76. The text cleaning and pre-processing module 76 is configured to perform various functions on the received text, such as stop word removal, concatenated word splitting, word tokenization, word lemmatization and stemming, etc. This cleaned-up text is then provided to a word embedding module 78, which may be configured for any suitable environment or system. According to various embodiments of the present disclosure, the word embedding module 78 may be configured to properly interpret words in the field of telecommunications.

The ML pipeline 70 further includes a data point selection module 80. In some embodiments, the data point selection module 80 may be configured to obtain triplet inputs, such as anchors, positives, and negatives. For example, the triplet data may be similar to the data points obtained using the method described with respect to FIG. 4. Next in the ML pipeline 70 is a building module 82, which may include one or more ML techniques for training an initial dataset. In some embodiments, the building module 82 may utilize Siamese neural networking techniques. During training, the building module 82 is configured to train one or more ML models in the model training module 84. After the initial dataset is obtained, the building module 82 may be configured to supply new data associated with the network for utilizing the ML models, which may be referred to as ML inference, to an inference module 86. The inference module 86 is configured with the already-trained ML models for performing ongoing analysis of new data with respect to the network to process alarms, faults, and comments from network operators. For example, by analyzing the new data, the inference module 86 may be configured to prioritize alarms as appropriate when multiple alarms are received.

Figure 6:
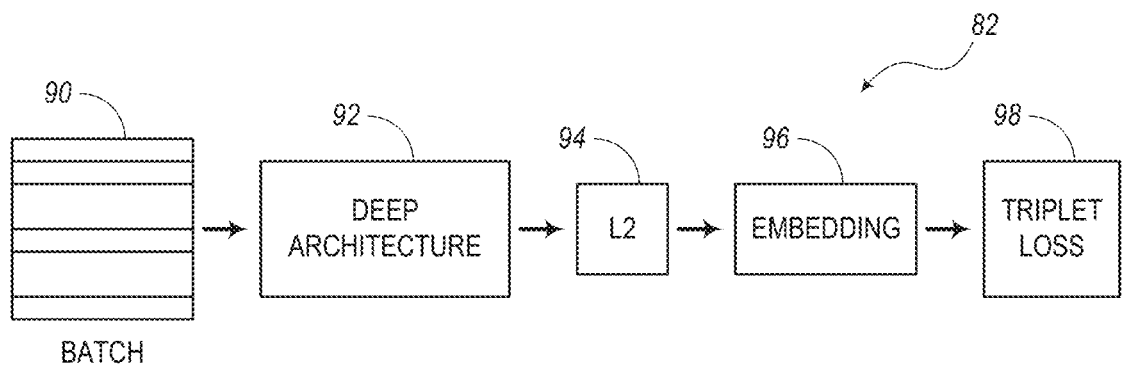
FIG. 6 is a block diagram illustrating the building module shown in the ML pipeline of FIG. 5, according to various embodiments.

FIG. 6 is a block diagram illustrating an embodiment of the building module 82 shown in the ML pipeline 70 of FIG. 5. In this embodiments, the building module 82 includes a batch unit 90, a deep architecture unit 92, an L2 unit (e.g., L2 normalization deep learning unit), an embedding unit 96, and a triplet loss unit 98. For example, the building module 82 may be configured to analyze faults, alarms, and textually-based comments.

One of the benefits of the ML pipeline 70 and building module 82 is that the process of fault/alarm/comment analysis can be completely automated, such as by leveraging state-of-the-art ML techniques. More particularly, the ML pipeline 70 is configured to automate this analysis by using a "hybrid" model for both the training aspects and inference aspects of ML without user interaction. This approach is configured to produce actionable insights very soon after deployment while minimizing computational overhead. This approach is also configured to handle (typically sparse) user feedback very well, where a new model may be produced after partial retraining only.

Furthermore, the output embeddings of ML pipeline 70 give a sense of the similarity and/or dis-similarity between different classes, which makes the approach suitable for ranking predictions and alarms in addition to classifying them. The embodiments of the ML pipeline 70 are also configured to be well-suited for multi-vendor deployments and transfer learning applications. The ML pipeline 70 can also extract useful information regardless of variations in terminology used by different vendors and users.

Experimental Results

The hybrid ML processing systems and methods of the present disclosure, such as those described above with respect to FIGS. 1-6, were tested to determine if their performance is an improvement over conventional systems. The results show that the systems and methods of the present disclosure indeed outperformed many conventional schemes. The present disclosure includes document embeddings from the doc2vec program, which was integrate with the Siamese Neural Network (SNN). Doc2vec was utilized since it was expected in the particular environment of network management that network operators (e.g., administrators, users, technicians, engineers, etc.) would provide textual data, including, for example, the collection of different documents. Doc2vec is a Natural Language Processing (NLP) tool for representing documents as a vector and is a generalizing/extended version of the Word2vec tool. For testing the present systems and methods, real-world textual data was collected from inputs by NOC engineers. This input included comments, ticketing information from ticketing tools, and input from other data sources. This dataset was used for training the doc2vector model and the results of the document embeddings are described below.

Figures 7, 8:
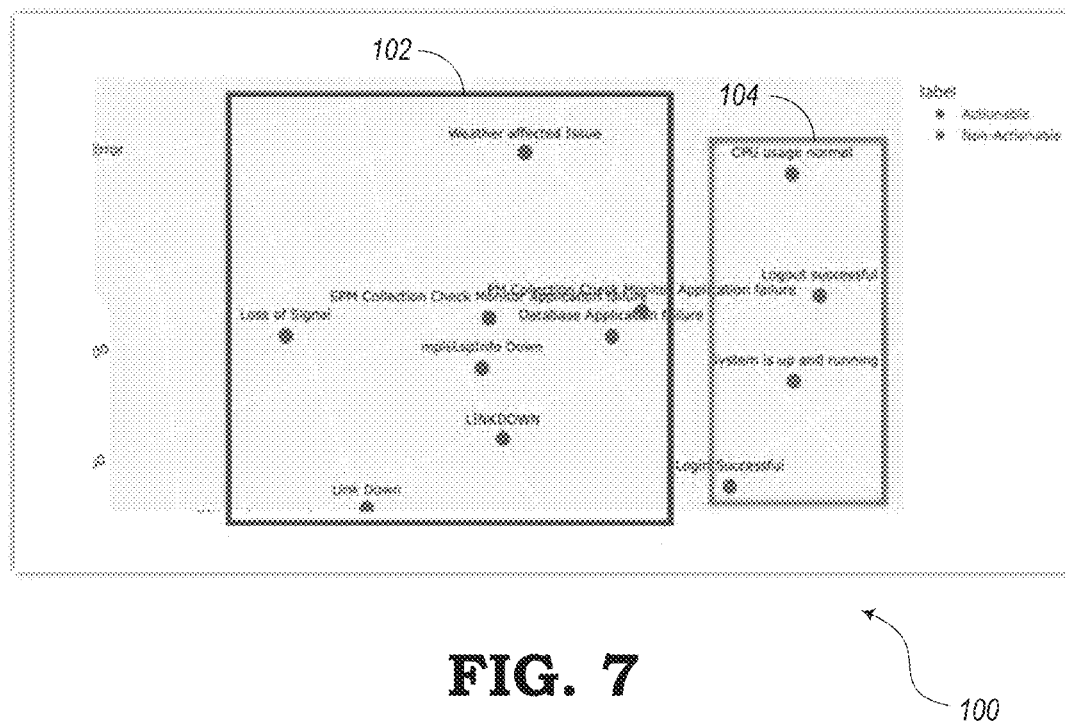
FIG. 7 is a diagram illustrating a document embedding plot with actionable and non-actionable alarms, according to various embodiments.
FIG. 8 is a table illustrating an example of a classification report for evaluating an ML model created by the computing system of FIG. 1, according to various embodiments.

FIG. 7 is a diagram illustrating a document embedding plot 100 with actionable comments 102 (e.g., alarms) and non-actionable comments 104 (e.g., non-alarm text). The document embedding plot 100 is depicted on a map of a network to show from whence each of the comments is received. The non-actionable comments 104 includes positive comments, such as "CPU usage normal," "Login successful," among others. These positive comments do not require any remediation in the network. However, the actionable comments 102 include negative comments, such as "Loss of Signal," "Link down," "Database application failure," among others. These negative comments may require some type of remediation in the network to overcome any issues.

From the document embedding plot 100, the document embedding representation can be observed and an analysis (e.g., sentiment analysis) can be performed to understand the sentiment of the user's comments. For example, words like "issue," "loss," "error," "problem," "down," etc. may be indicative of a sentiment that there is some fault or alarm that should be handled to allow the network to operate properly. On the other hand, words such as "successful," "normal," etc. may be indicative of a positive sentiment where the user is trying to convey that certain sections or equipment of the network are normal and do not require attention. Therefore, the positive comments 104 include less important data and may provide a dataset that is close to each other in the plot of FIG. 4, whereas the negative comments 102 include more important/crucial data, which would normally need more attention from the NOC engineers.

The test results show with certainty that the embodiments of the present disclosure provide useful information and successfully perform the concept that document embedding from doc2vec can be leveraged to train the SNN model and/or XGBoost model to perform classification tasks by providing proper labels to the document vectors. The SNN works to minimize the triplet loss when training is applied. Hence, the triplets of anchors with positive data samples and anchors with negative data samples, as described with respect to FIG. 4, can be leveraged to provide very good test results.

Tests were run on real data for training the SNN and the real historic comment/textual data for one of the customers (Comporium/SDN) were considered. After forming several data triplets, the results were used for model training and the results were satisfactory to prove the present concepts very well. In other words, the embodiments show that, even if there are very few data samples available, the SNN can still make the most out of the limited information passed during the model training. The results include model evaluation (e.g., Consolidated Metrics), where the nature of the ML problem is multi-class classification, and the ML algorithms used, where against NLP tasks for pre-processing (e.g., stop words remover, word tokenizer, word lemmatizer and stemmer, Word Ninja, etc.). For document embedding building (Doc2vec). Classification task is a state-of-the-art algorithm (e.g., SNN and XGBoost).

The metrics used are Classification Report and Confusion Matrix. Regarding the Classification Report, even though the present disclosure deals with a complex data format and imbalanced dataset, the F1 scores for each class tells how well the present models were trained. The 100% F1 score, for example, simply means that the embodiments of the present disclosure do not miss any high-priority comments made by NOC engineers. This means that none of these issues will go unnoticed. Hence, the embodiments of the present disclosure can provide certainty that they will always be remediated in real-time.

FIG. 8 is a table illustrating an example of a classification report 110 for evaluating an ML model created by the computing system of FIG. 1. The 100% accuracy means that the hybrid ML systems and methods of the present disclosure will not only catch all the issues when they happen but also will never misclassify something as a problem when it is not. This is particularly important for this approach to be of practical importance as this will make sure no human efforts and precious inspection time is spent for investigating things that are not real issues.

FIG. 9 is a graph 120 showing an example of a confusion matrix from the testing results. The confusion matrix evaluates an ML model created by the computing system 10. The depiction of the graph 120 as a confusion matrix may be a better way to evaluate the performance of a classifier. The general idea is to count the number of times instances of class A are classified as class B. The confusion matrix in this case shows that the ML pipeline 70 of FIG. 5 could classify every class perfectly with zero false positives (i.e., 100% accuracy).

FIG. 10 is a table 130 illustrating sample results for showing the capability of the computing system 10 of FIG. 1, and particularly the alarm prioritization unit 28 and ML pipeline 70. The table shows how the systems and methods of the present disclosure are configured to accurately predict network alarms. In the testing of True Vs ML Prediction, the table 130 shows the test samples that clearly demonstrate the capability of the hybrid ML systems and methods of the present disclosure. The examples were randomly picked and never shown to the ML algorithm during its training. The SNN was able to make the correct classifications against the unseen data as well.

Siamese Neural Network (SNN) vs. XGBoost Comparison

The SNN and XGBoost ML models were tested for accuracy and computational cost (e.g., time, complexity, etc.) to determine the trade-offs between the two. It may be noted that other ML algorithms or schemes may be used in place of one or both of these ML models to provide the benefits described in the present disclosure. Namely, a first ML model should be able to perform with sufficient accuracy with a small dataset (e.g., when a network is in its infancy stage, such as less than 6 months old). Also, a second (or additional) ML model(s) should be able to perform with sufficient accuracy after the dataset reaches a certain threshold (size) where it can at least closely match the accuracy of the first ML model. Furthermore, this second (or additional) ML model(s) should be able to operate at a more efficient, less computationally costly manner. In this way, the systems and methods of the present disclosure may be configured switch from the first ML model to a second ML model to take advantage of the different benefits of each. Also, if needed, the present systems and methods may switch to a third ML model and even switch to additional ML models if it is determined that doing so would be beneficial based on the various trade-offs from among the multiple ML models.

To test the efficacy of the hybrid boosting ML system, a network was tested under various scenarios with different training dataset sizes. The tests are run with the change in training data volume from fewer to more data points in mind. This allowed the present systems and methods to build a learning curve for each ML model. In this case, experimental results were tracked using MLFlow.

In this experiment, the results showed that XGBoost underperformed when the training data volume was low (e.g., between about 4 and 22 data points), whereas the SNN outperformed XGBoost by a significant margin for the same training and testing sample volume. XGBoost eventually was able to match SNN's performance for the volume of training data from about data point number 31. As the volume of the training data grew, both ML algorithms were found to work equally well.

Figure 11:
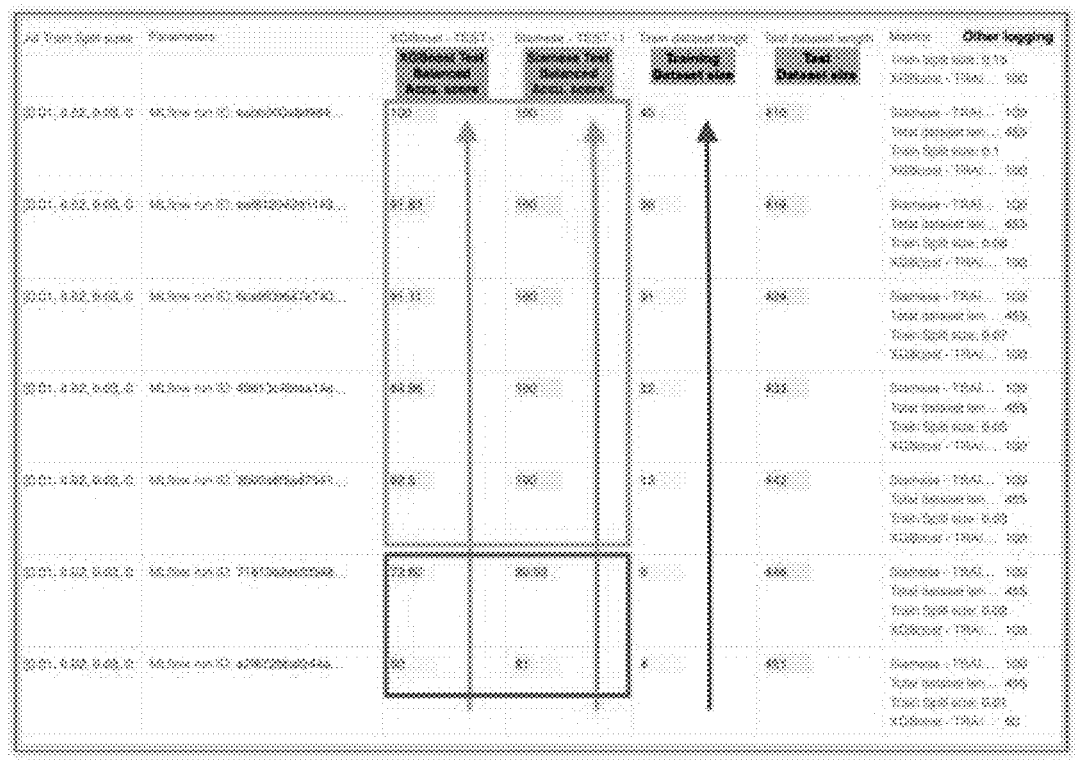
FIG. 11 is table illustrating results of an accuracy test for different ML techniques, according to various embodiments.

FIG. 11 is a table 140 showing the results of the accuracy test for the different ML techniques (e.g., SNN and XGBoost). Again, MLFlow was used for testing accuracy scores. The table 140 plots a head-to-head comparison between SNN and XGBoost against the achieved accuracy scores with respect to provided training data samples.

Figure 12:
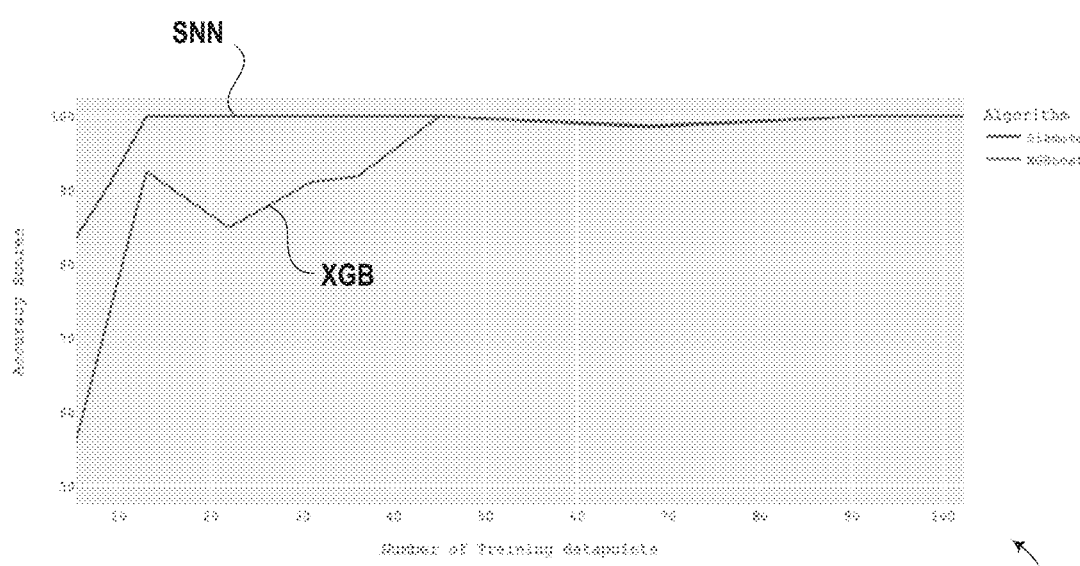
FIG. 12 is a graph illustrating the accuracy scores of SNN and XGBoost techniques with respect to the size of the training dataset, according to various embodiments.

FIG. 12 is a graph 150 that shows the accuracy scores of the SNN and XGBoost techniques with respect to the size of the training dataset in a head-to-head comparison against the provided training data samples. From the graph 150, it may be observed that when the training data volume is low, the XGBoost performance is lower than SNN. As the amount of training data grows, XGBoost is able to match the performance of SNN.

When it comes to fewer training data volumes, the difference in model performance between Siamese and XGBoost can be clearly seen. However, the superior performance of SNN's stats come at an expense of time. For example, as SNN is a sophisticated neural network, it takes longer to learn (train) than the traditional XGBoost ML algorithm, whereby, at some point, it simply becomes prohibitive to use SNN. Specifically, it can be seen from the graph 150 that the difference in computation time between SNN and XGBoost continues to grow as the amount of data increases.

Figure 13:
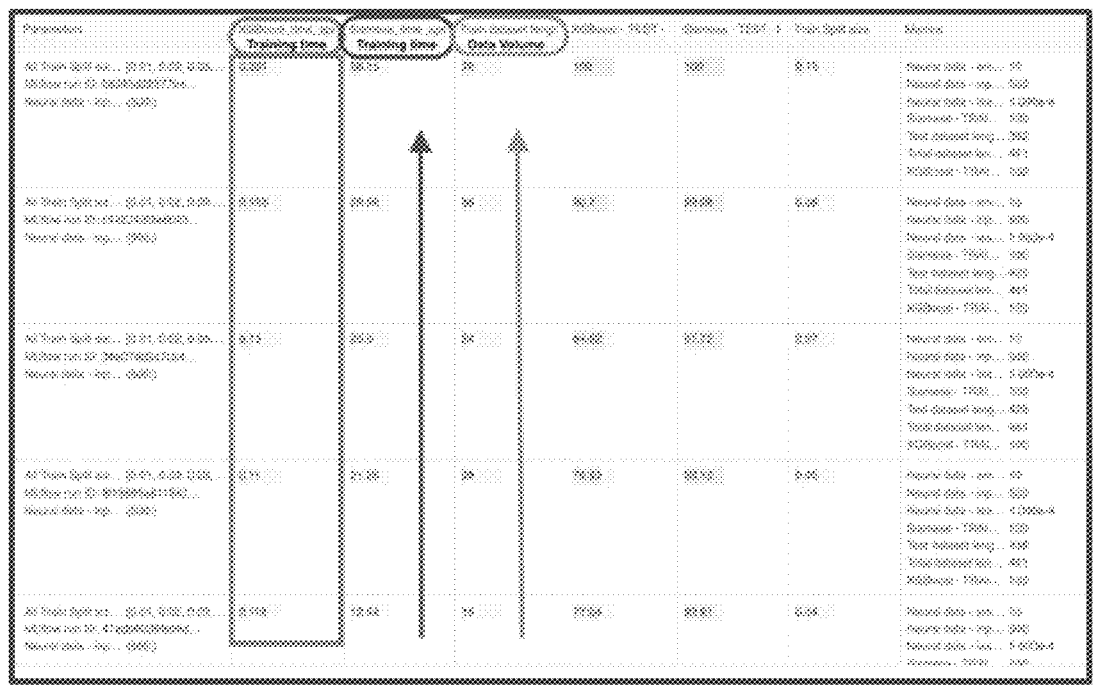
FIG. 13 is a table illustrating times for completing ML inference for SNN and XGBoost techniques, according to various embodiments.

FIG. 13 is a table 160 showing times for completing ML inference for SNN and XGBoost techniques, again using MLFlow test tracking in this example test. The times are shown in seconds. The table 160 shows a head-to-head comparison of SNN and XGBoost against the time spent (in seconds) on ML model training based on the training data samples provided.

Figure 14:
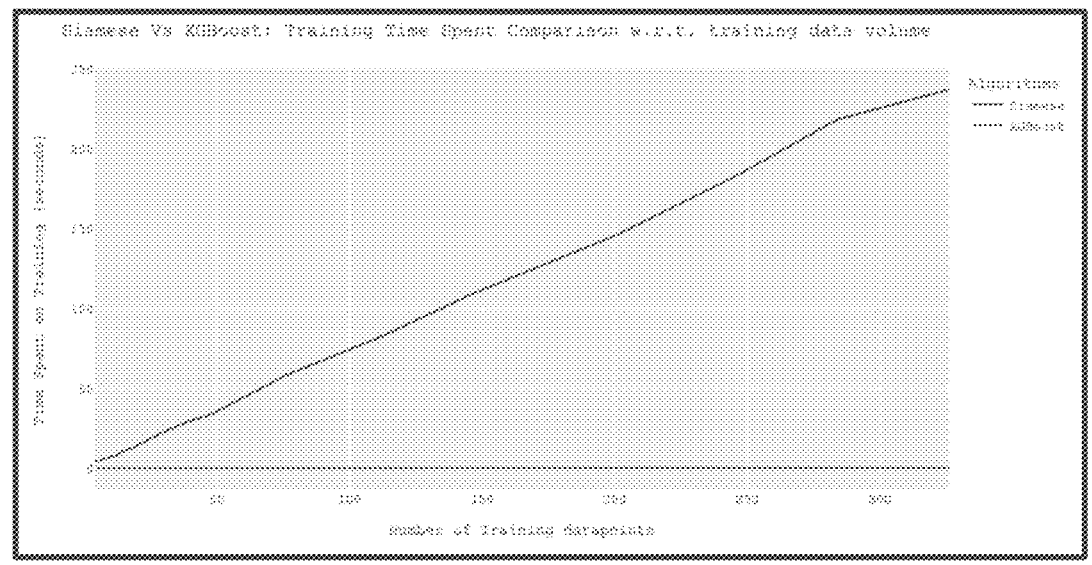
FIG. 14 is a graph illustrating training times of SNN and XGBoost techniques with respect to the size of the training dataset, according to various embodiments.

FIG. 14 is a graph 170 illustrating training times of SNN and XGBoost techniques with respect to the size of the training dataset. In this head-to-head comparison, the graph 170 shows ML model training times spent against the provided training data volume. The graph 170 shows that the ML model training time for SNN essentially increases linearly with training data volume, whereas the XGBoost training time is essentially unaffected by training volume.

CONCLUSION

The automatic ML systems and the methods of the present disclosure provide a hybrid (e.g., training plus inference) system that is configured adapt itself based on certain characteristics of a plurality of ML models that are utilized. In the field, a solution that requires customers to train the ML models and monitor/track the performance of the machine learning algorithm once it is deployed on-premises can be difficult. To address the issue, the systems and methods of the present disclosure are configured to provide a solution in which machine learning models are automatically trained and deployed to production only if they meet certain criteria, such as comparing certain performance metrics of the newly trained model to the current production model against the same set of data.

The present embodiments are configured to automatically replace the old model with a new model if it meets certain criteria. The hybrid system of the present disclosure includes the ML model selection process, as opposed to an ensemble approach. The hybrid boosting system can handle scenarios in which it can predict and select which ML algorithm to use at specific times. Therefore, the hybrid system of the present disclosure can be incorporated in control device (e.g., computing system 10) at a NOC or Network Management System (NMS) controller to thereby give the host an advantage in that it can decide which model framework to use based on various factors (e.g., training dataset size, expected accuracy scores, computational requirements, training time, inference time, etc.).

Thus, the present systems and methods include at least the following benefits: 1) Automatic model selection and Automatic Hybrid Boosting ML, 2) Automatic data split into training/validation sets using X-fold cross-validation, 3) Optimization based on the primary metric, 4) Self-exit criteria (e.g., if the new model performs poorly).

In some embodiments, the present systems and methods may be configured to log accuracy measurements over time (e.g., using a tool like MLFlow) to serve the above-mentioned purposes. The present embodiments may use these logged metrics to decide whether or not to promote the new model and/or which next model to use when multiple models are available.

Figure 15:
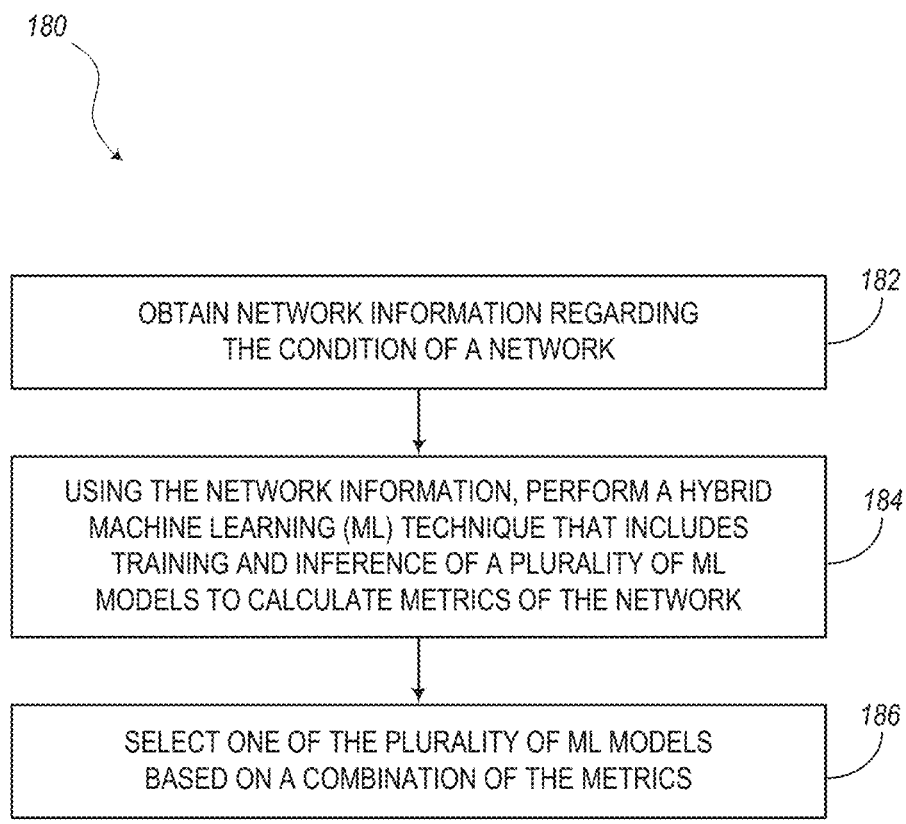
FIG. 15 is a flow diagram illustrating a process for prioritizing network alarms, according to various embodiments.

FIG. 15 is a flow diagram showing an embodiment of a process 180 utilizing a hybrid training/inference ML system, such as for analyzing and prioritizing network alarms. In the illustrated embodiment, the process 180 includes obtaining network information regarding the condition of a network, as indicated in block 182. Using the network information, the process 180 further includes the step of performing a hybrid Machine Learning (ML) technique that includes training and inference of a plurality of ML models to calculate metrics of the network, as indicated in block 184. The process 180 also includes the step of selecting one of the plurality of ML models based on a combination of the metrics, as indicated in block 186.

The network information may include, for example, a) network fault information, b) network alarm information, and c) textual comments entered by a network operator describing the condition of the network. In some embodiments, the process 180 may further include the step of performing the hybrid ML technique in order to prioritize faults or alarms with respect to the network. Furthermore, the process 180 may include performing a pre-processing technique to prepare the textual comments for use with the hybrid ML technique. For example, the pre-processing technique may include a Natural Language Processing (NLP) methodology including the actions of a) splitting concatenated words, b) removing stop words, c) stemming and lemmatization to identify root words, d) tokenization, e) using a word-to-vector model, f) using a document-to-vector model, and/or g) using an embedding process for handling terminology related to the field of telecommunications.

The selected ML model described above may be selected based on a size of a dataset of the network information. The selected ML model may also be selected based on a) an historic accuracy score of each of the plurality of ML models calculated during training, b) an expected accuracy score of each of the plurality of ML models for later use during inference, c) a computational cost of each of the plurality of ML models during training, d) a training time associated with each of the plurality of ML models, and/or e) an estimated inference time associated with each of the plurality of ML models.

The process 180 may utilize a first ML model when a network is initially deployed, where the first ML model may be a Deep Neural Network (DNN) model. The process 180 may then switch from the first ML model to a second ML model based on the above-mentioned combination of metrics. For example, the first ML model may provide greater accuracy than the second ML model, and the second ML model may provide a faster training time and faster inference time than the first ML model. More particularly, according to some embodiments, the first ML model may be a Siamese Neural Network (SNN) model and the second ML model may be an XGBoost model.

The process 180 may further include the step of processing the calculated metrics to differentiate actionable alarms from non-actionable alarms. In some embodiments, the process 180 may be implemented by a system that is part of a Network Operations Center (NOC). The step of obtaining network information (block 182) may include the actions of a) receiving information from network equipment provided by different vendors, b) receiving information from different networking layers, c) receiving information from different domains of the network, d) receiving information from an alarm management system, and/or e) receiving information from a ticketing system. Also, the process 180 may include the step of continuously retraining the selected ML model using new network information.

The systems and methods of the present disclosure are configured to prioritize alarms. This is an improvement over previous solutions and works in a broader scenario. The systems may leverage ML to solve various issues in a network. A problem with many ML devices is that it normally needs a lot of data to effectively analyze issues. The present disclosure works even when there is limited data, like when a network is initially deployed. This provides good accuracy, even at the beginning, and can get incrementally better over time.

The present disclosure analyzes textual data, like user comments. Words can run through a transformation process to convert them into vectors, which can be an NLP methodology. Users can describe a problem in different ways, phrasing it differently. The present disclosure can use a transformer that is designed to operate in a certain environment, such as working on a telecom data. The algorithms can receive different descriptions and compute a vector for different phrases that mean the same thing. Thus, the output for each of them can be very similar. The mathematical differences between the different outputs might be very small. FIG. 7 is related to telecom and includes alarms. Different users might say, "Login successful" or "User able to log-in to the system" or some terminology, but it might mean the same thing. The mapping will be very close for these two example comments. This can ensure that the paraphrasing does not have an impact on the outcome.

Secondly, FIG. 11 shows the process of training more than one algorithm at the same time. Once metrics are obtained, the present disclosure is configured to calculate the accuracy (e.g., precision, recall, etc.), computation time, and other factors and can switch between those two (or more) algorithms. This switching action is decided for the inference process. Later, for computational efficiency, when a model is already selected, the present disclosure does not keep training all the models, according to various embodiments, but, based on some metrics, the methods may utilize two algorithms that behave differently under different conditions. One may be very good when there is less data, and the other may work better (e.g., less computationally expensive) when there is more data. This considers computation cost, precision, recall, accuracy, etc. More than one model can be used, wherein, in the examples, two are shown and described in detail. With more than one model, this allows the embodiments to perform well when we have conditions of less data (at times). SNN works well when you have very little data (selection of algorithm based on size of dataset). By allowing selection of different algorithms (particularly where one is good with smaller dataset and the one is good with larger dataset), this results in good accuracy or performance across the board. Even just 13 data points may be enough to get good accuracy.

Again, an ensemble model is different than the hybrid systems and methods of the present disclosure. The present disclosure uses different models depending on a regime (e.g., the dataset size, computational cost, etc.). The systems may consider computational cost to train and to do inference to help us choose a model that is the best for re-training or for inference.

NLP is a pre-processing step. The heart of the present embodiments may be considered to be the selection of the different models. In order to get the effective results, the pre-processing is used. Without pre-processing, FIG. 11 might show, for the dataset size, how the accuracy changes. Up to a certain range (training dataset size), the systems use SNN, then switch to XGBoost. If no pre-processing is done, the accuracy would fall for both and might give inaccurate results. This, in turn, might lead to lower accuracy and maybe even switching to the other model at the wrong time.

Once the system learns the NLP transformer, the network issues become a supervised ML problem. For the NLP part, it is a pre-trained model. Once the network is deployed, incrementally training is not needed. For example, with telecom data, the system may be configured to use that to learn a mapping function, which is done just once. A sentence may be entered and the system maps it to a vector. This can be done by the computing system 10 offline. Then, the computing system 10 shifts with the pre-trained model. Based on different customers or even different environments, there might be different models used. The computing system 10 may use a mega interceptor from different customers, train the model, and use the model across the board. What this model is trying to do is capture the subtleties of communication data, such as the communication terms that are often used, learning which terms are similar or different.

The computing system 10 may train the model to learn the transformation on already-rich data. It does not have to be specific to a particular problem. The computing system 10 may be concerned with how network problems might be expressed in different ways in the English language (or other language). A pre-training open source model may be available. In some embodiments, telecom data language may be the vocabulary used by network operators associated with a NOC system. When there are alarms, the user may provide comments or observations of what is happening at the NOC.

For example, if this is not rich enough (from one domain to another), the model may be trained on WAN, which might be different from a Wi-Fi network and might not work. Thus, one model for one network might not work with another network, because the language used to train it may be significantly different from one domain to another. So, the user would need to know his or her domain and ideally how to train that domain. Otherwise, it would be no worse than using generic language and using simple transforming methods.

The present disclosure may be directed to the actual usage (interference) part of the application of those ML algorithms (e.g., for identification of a fault). SNN was originally developed for facial recognition and tries to learn something from images to classify something, particularly where there may be less than an ideal amount of image information. It was designed to solve the n-shot learning issue, where there are very few training examples. Since SNN is an NN, the training can be very expensive, especially over time as the training dataset size increases. This is where the intelligence of the computing system 10 comes into play in order to identify when to use SNN (with low amounts of training data) and switch to the other (XGBoost) system. The computing system 10 can use intelligence to determine when to stop using the SNN (e.g., see FIG. 14), such as when the time needed exceeds a certain threshold (e.g., more than 50 secs).

Other thresholds (e.g., one or more at a time) may be used for determining when to switch from one model to another. At first, when training, the computing system 10 may use both (or all) algorithms. The present disclosure may compare the results by looking at three different things. One thing is the accuracy (e.g., both precision and recall) of the model. Another is how much time it takes for training. And a third is the dataset size, which might be governed under the other two. Over time, the computing system 10 continuously compares. For example, when more data is obtained, the computing system 10 is configured to trigger a run, since over time it can incrementally improve the models in the system. The difference between the models can be seen, as described above. When the two (or more) models are getting to the point where they are very similar (in performance or accuracy, although they need not be limited thereto), this is when the computing system 10 can switch over to the other (XGB) because it may know that it can get similar performance with less computational or training cost. Also, the thresholds need not be a static value and could be a cost function.

This may all be automated in the computing system 10. Thresholds may be in place to determine switching from one model to another. Of course, the thresholds can be learned as well, since different systems can vary from one system to another. Detection of accuracy can also be automated. The computing system 10 can divide this into a training dataset and a testing dataset. The training dataset can be used to train or learn the function. Then, the testing dataset (which is kept separate) is fed to the model to see how accurate the predictions are from the true results. Also, the thresholds (or cost functions) can be dynamic, based on heuristics (i.e., not learned), or learned (e.g., using some ML technique).

The computing system 10 may utilize the database 20 as a catalog or registry to store information about how much time it takes to compute, the training dataset size, the testing dataset size, the accuracy (precision, recall), etc. These metrics may be stored with respect to each model.

In summary, the computing system 10 may be configured to detect when a system (e.g., network 26) is newly deployed. The computing system 10 looks at all the alarms that come into the system. The computing system 10 analyzes these alarms and is configured or scheduled for re-training or improving it. Since alarms are dynamic, more and more alarms over time may be obtained from the system after it is deployed. Next, the NOC operator may also give comments for these alarms, which also continues to grow over time.

When the system (network) is first deployed or is allowed to start or boot up, what the computing system 10 does is analyze alarms. It may do model training for more than one model. An intelligent decision will be made as to which model to use. For the sake of explanation, the data initially will be limited. The system will decide that SNN is the best model to use based on these metrics. The accuracy would be the most important metric (initially) in deciding that. As a result of that, as the live alarms are analyzed, it will be analyzed using the SNN. When the analysis is started, the computing system 10 may be configured to retrain over a certain timeframe (e.g., one week at a time). Within that timeframe, new data is received (e.g., new comments). The computing system 10 keeps re-analyzing the data. It can train both SNN and XGB. It will see at some point that XGB has the same accuracy as SNN and use ongoing training to continue.

The hybrid boosting systems and method allow the auto-ML processes to adapt itself based on the data points. The computing system 10 collects/measures meta information about the environment, such as training data size, expected/historical accuracy scores, computational requirements, training time, inference time, etc. These metrics are continuously combined in a single cost/benefit model for each ML algorithm enrolled in the framework. Any supervised ML algorithm can be onboarded on demand (e.g., via REST APIs). Hybrid boosting systems of the present disclosure can decide which ML algorithm is optimal to deliver the best accuracy given the above model and constraints.

The systems and methods can automatically retrain ML models on a regular basis or when actual accuracy decreases and becomes significantly lower than the expected accuracy. The systems replace the production model with the new optimal model when necessary. This makes post-customer deployment maintenance a lot easier.

Furthermore, another point of novelty is the use of Siamese Neural Network for learning and predicting the similarity/dis-similarity of a fault/alarm from known fault/alarm classes. SNNs are particularly suited for applications with limited data, such as customer feedback.

The novel multi-step system combines techniques from NLP and state-of-the-art Machine Learning for fault/alarm comment analysis. Use of doc2vec transformer for network fault comment embeddings, which enables analysis of free-form text, is also unique in the present disclosure.

The present disclosure also provides a novel system for model training and inference that uses a hybrid approach that requires significantly less training data to achieve comparable results. The fact that the present system requires little training data may be important for its practical application in the deployment of new networks. This means that the system may begin providing useful insights much sooner.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
   a processing device, and
   a memory device configured to store a computer program having instructions that, when executed, enable the processing device to
   obtain network information regarding the condition of a network,
   using the network information, perform a hybrid Machine Learning (ML) technique that includes training and inference of a plurality of ML models to calculate metrics of the network,
   wherein a first ML model and a second ML model of the plurality of ML models are trained utilizing a same version of a training dataset of the obtained network information when a size of the training dataset is less than a threshold,
   wherein the first ML model is used for inference before the size of the training dataset reaches the threshold,
   wherein the second ML model is used for inference after the size of the training dataset reaches the threshold, and
   wherein the first ML model is more accurate than the second ML module at least when the size of the training dataset is less than the threshold, and the second ML model is at least one of faster to train or generates an inference faster than the first ML module, and
   subsequently select one of the plurality of ML models based on a combination of the metrics for generating an inference utilizing only real-time data and the selected one of the plurality of ML models, wherein the selected ML model is selected based on one or more of an historic accuracy score of each of the plurality of ML models calculated during training, an expected accuracy score of each of the plurality of ML models for later use during inference, a computational cost of each of the plurality of ML models during training, a training time associated with each of the plurality of ML models, and an estimated inference time associated with each of the plurality of ML models.

2. The system of claim 1, wherein the network information includes one or more of network fault information, network alarm information, and textual comments entered by a network operator describing the condition of the network.

3. The system of claim 2, wherein the instructions further enable the processing device to perform the hybrid ML technique in order to prioritize faults or alarms with respect to the network.

4. The system of claim 2, wherein the instructions further enable the processing device to perform a pre-processing technique to prepare the textual comments for use with the hybrid ML technique.

5. The system of claim 4, wherein the pre-processing technique is a Natural Language Processing (NLP) methodology including one or more of the actions of splitting concatenated words, removing stop words, stemming and lemmatization to identify root words, tokenization, using a word-to-vector model, using a document-to-vector model, and using an embedding process for handling terminology related to the field of telecommunications.

6. The system of claim 1, wherein the instructions further enable the processing device to
utilize the first ML model when the network is initially deployed, the first ML model being a Deep Neural Network (DNN) model.

7. The system of claim 1, wherein the first ML model is a Siamese Neural Network (SNN) model, and the second ML model is an XGBoost model.

8. The system of claim 1, wherein the instructions further enable the processing device to process the calculated metrics to differentiate actionable alarms from non-actionable alarms.

9. The system of claim 1, wherein the system is part of a Network Operations Center (NOC).

10. The system of claim 1, wherein obtaining network information includes one or more of the actions of receiving information from network equipment provided by different vendors, receiving information from different networking layers, receiving information from different domains of the network, receiving information from an alarm management system, and receiving information from a ticketing system.

11. The system of claim 1, wherein the instructions further enable the processing device to continuously retrain the selected ML model using new network information.

12. The system of claim 1, wherein the instructions further enable the processing device to subsequently retrain the plurality of ML modules utilizing a new training dataset of the obtained network information, and wherein, when a size of the new training dataset is over the threshold, only the second ML module is retrained.

13. The system of claim 12, wherein, when the size of the new training dataset is over the threshold, the second ML module is automatically selected for generating the inference from the real-time data.

14. A non-transitory computer-readable medium configured to store computer logic having instructions that, when executed, cause one or more processing devices to:
obtain network information regarding the condition of a network,
using the network information, perform a hybrid Machine Learning (ML) technique that includes training and inference of a plurality of ML models to calculate metrics of the network,
wherein a first ML model and a second ML model of the plurality of ML models are trained utilizing a same version of a training dataset of the obtained network information when a size of the training dataset is less than a threshold,
wherein the first ML model is used for inference before the size of the training dataset reaches the threshold, and
wherein the second ML model is used for inference after the size of the training dataset reaches the threshold, and
wherein the first ML model is more accurate than the second ML module at least when the size of the training dataset is less than the threshold, and the second ML model at least one of faster to train or generates an inference faster than the first ML module, and
subsequently select one of the plurality of ML models based on a combination of the metrics for generating an inference utilizing only real-time data and the selected one of the plurality of ML models, wherein the selected ML model is selected based on one or more of an historic accuracy score of each of the plurality of ML models calculated during training, an expected accuracy score of each of the plurality of ML models for later use during inference, a computational cost of each of the plurality of ML models during training, a training time associated with each of the plurality of ML models, and an estimated inference time associated with each of the plurality of ML models.

15. The non-transitory computer-readable medium of claim 14, wherein the network information includes one or more of network fault information, network alarm information, and textual comments entered by a network operator describing the condition of the network.

16. The non-transitory computer-readable medium of claim 15, wherein the instructions further enable the processing device to perform the hybrid ML technique in order to prioritize faults or alarms with respect to the network.

17. The non-transitory computer-readable medium of claim 15, wherein the instructions further enable the processing device to perform a pre-processing technique to prepare the textual comments for use with the hybrid ML technique, wherein the pre-processing technique is a Natural Language Processing (NLP) methodology including one or more of the actions of splitting concatenated words, removing stop words, stemming and lemmatization to identify root words, tokenization, using a word-to-vector model, using a document-to-vector model, and using an embedding process for handling terminology related to the field of telecommunications.

18. A method comprising the steps of:
obtaining network information regarding the condition of a network,
using the network information, performing a hybrid Machine Learning (ML) technique that includes training and inference of a plurality of ML models to calculate metrics of the network,
wherein a first ML model and a second ML model of the plurality of ML models are trained utilizing a same version of a training dataset of the obtained network information when a size of the training dataset is less than a threshold,
wherein the first ML model is used for inference before the size of the training dataset reaches the threshold,
wherein the second ML model is used for inference after the size of the training dataset reaches the threshold, and
wherein the first ML model is more accurate than the second ML module at least when the size of the training dataset is less than the threshold, and the second ML model is at least one of faster to train or generates an inference faster than the first ML module, and subsequently selecting one of the plurality of ML models based on a combination of the metrics for generating an inference utilizing only real-time data and the selected one of the plurality of ML models, wherein the selected ML model is selected based on one or more of an historic accuracy score of each of the plurality of ML models calculated during training, an expected accuracy score of each of the plurality of ML models for later use during inference, a computational cost of each of the plurality of ML models during training, a training time associated with each of the plurality of ML models, and an estimated inference time associated with each of the plurality of ML models.

\* \* \* \* \*